United States Patent [19]

Okada, deceased et al.

[11] Patent Number: 4,784,091
[45] Date of Patent: Nov. 15, 1988

[54] CYLINDER HEAD COVER STRUCTURE FOR A V-TYPE ENGINE

[75] Inventors: Masatoshi Okada, deceased, late of Kariya, Japan, by Masayuki Okada a legal representative; Masami Nishida; Kazuaki Hokazono, both of Hiroshima, Japan

[73] Assignee: Mazda Motor Corporation, Hiroshima, Japan

[21] Appl. No.: 35,330

[22] Filed: Apr. 7, 1987

[30] Foreign Application Priority Data

Apr. 8, 1986 [JP] Japan ................................ 61-80586

[51] Int. Cl.⁴ ............................................ F02M 35/10
[52] U.S. Cl. ............................ 123/52 MV; 123/90.38
[58] Field of Search .......... 123/193 H, 52 M, 52 MV, 123/90.27, 90.38

[56] References Cited

U.S. PATENT DOCUMENTS

| | | | |
|---|---|---|---|
| 1,132,256 | 3/1915 | Gunn | 123/90.38 |
| 2,845,911 | 8/1958 | Gill | 123/52 MV |
| 2,990,819 | 7/1961 | Bouvy | 123/90.38 |
| 3,303,832 | 2/1967 | Platner et al. | 123/52 M |
| 3,782,344 | 1/1974 | Schmuck | 123/52 M |
| 4,440,120 | 4/1984 | Butler | 123/52 MV |
| 4,643,138 | 2/1987 | Ruf et al. | 123/52 M |

*Primary Examiner*—Willis R. Wolfe
*Assistant Examiner*—Marguerite Macy
*Attorney, Agent, or Firm*—Gerald J. Ferguson, Jr.

[57] ABSTRACT

Each of the cylinder heads forming right and left cylinder banks of a V-type engine is provided, in the inner side wall thereof, with intake ports each communicating with a cylinder formed in the cylinder bank. A camshaft is provided in each cylinder bank above intake and exhaust valves to drive the valves in synchronization with the rotation of the engine and supported for rotation by a plurality of bearings. Each discrete intake passage is connected to one of the intake port of one of the cylinder banks and extends above the other cylinder bank. Cylinder head covers mounted on the respective cylinder heads are provided with recessed portions at the portions corresponding to the inter-bearing portions of the camshaft and said discrete intake passages extend through the recessed portions.

12 Claims, 3 Drawing Sheets

CYLINDER HEAD COVER STRUCTURE FOR A V-TYPE ENGINE

BACKGROUND OF THE INVENTION

1. Field of the Invention

This invention relates to a cylinder head cover structure for a V-type engine, and more particularly to a cylinder head cover structure which can contribute to the enhancement of the supercharging effect of the inertia of the intake air in a V-type engine.

2. Description of the Prior Art

There has been known, as disclosed in Japanese Unexamined Patent Publication No. 59(1984)-565, an intake system for a V-type engine in which the intake ports are formed in the inner sides (opposed sides) of the cylinder banks, and the intake passages connected to the intake ports of each bank extend to the inner side of the other bank and then are bent upwardly to form an arc in a vertical plane, thereby ensuring a sufficient length of the intake passages with the best use of the space between the banks and improvement of the inertia effect of intake air.

However, the intake system of the prior art is disadvantageous in that since the angle at which the cylinder banks are set to each other is substantially fixed and the intake passages are laid out in the space between the cylinder banks, the intake passages must be inherently elongated upward in order to ensure a sufficient length, thereby adding to the overall height of the engine.

SUMMARY OF THE INVENTION

In view of the foregoing observations and description, the primary object of the present invention is to provide a cylinder head cover structure in which a sufficient length of the intake passages can be ensured without adding to the overall height of the engine.

In accordance with the present invention, there is provided a cylinder head cover structure for a V-type engine having first and second cylinder heads for forming first and second cylinder banks, each cylinder head being provided, in the inner side wall thereof, with intake ports each communicating with a cylinder formed in the cylinder bank, at least one camshaft provided in each cylinder bank above intake and exhaust valves to drive the valves in synchronization with rotation of the engine and supported for rotation by a plurality of bearings, discrete intake passages each of which is connected to one of the intake ports of one of the cylinder banks and extends above the other cylinder bank, and cylinder head covers mounted on the respective cylinder heads, characterized in that recessed portions are formed in each of the cylinder head covers at the portions corresponding to the inter-bearing portions of the camshaft and said discrete intake passages extend through the recessed portions.

DESCRIPTION OF THE PREFERRED EMBODIMENT

Figure 1:
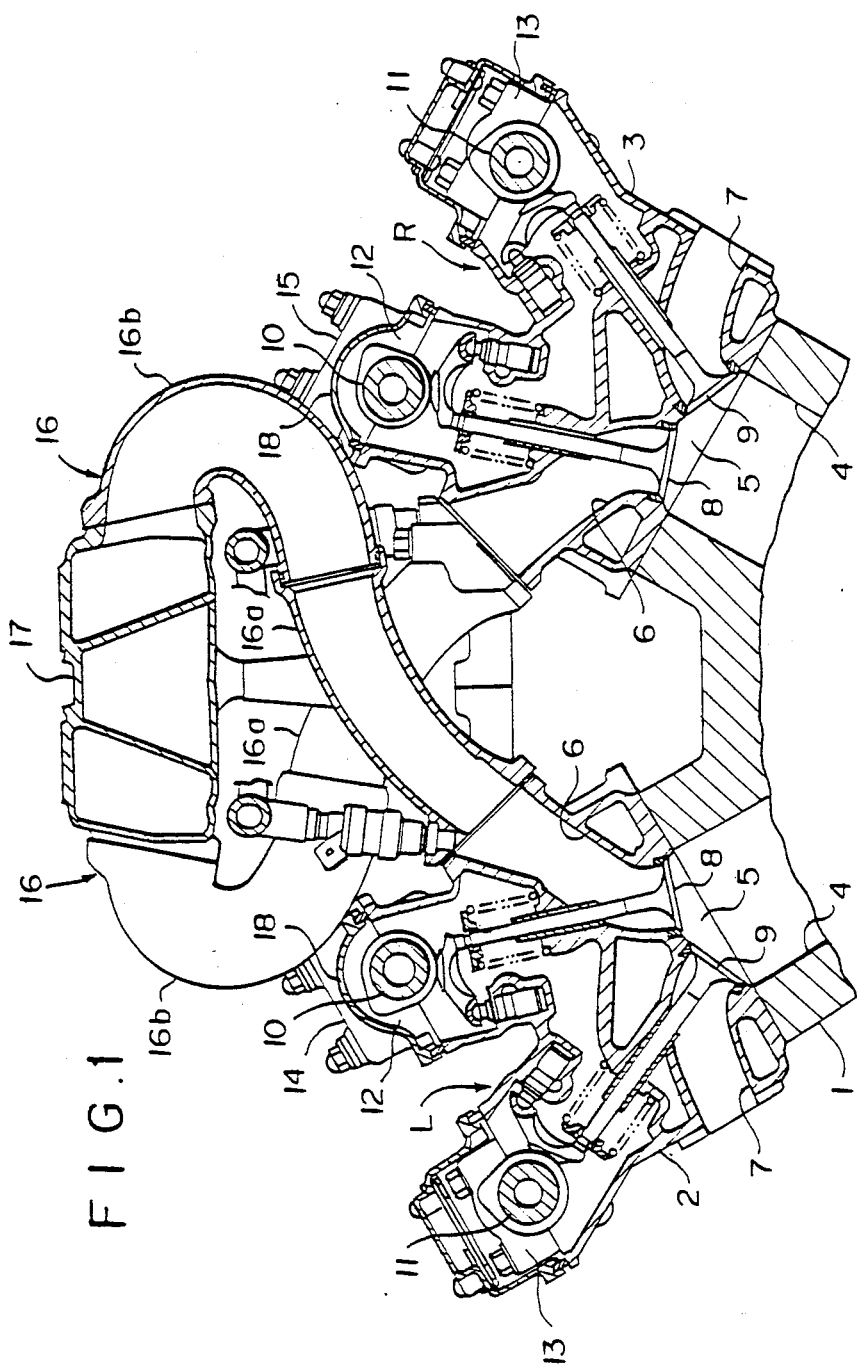
FIG. 1 is a cross-sectional view showing a V-type engine provided with a cylinder head cover structure in accordance with an embodiment of the present invention.

In FIG. 1, a V-type engine has a cylinder block 1 on which a cylinder head 2 for the left cylinder bank L and a cylinder head 3 for the right cylinder bank R are mounted at 60° to each other. Between the cylinder block 1 and the cylinder head 2 for the left cylinder bank L and between the cylinder block 1 and the cylinder head 3 for the right cylinder bank R are each formed three cylinders 4. A piston (not shown) is inserted into each cylinder 4 to form a combustion chamber 5 therein.

Figure 2:
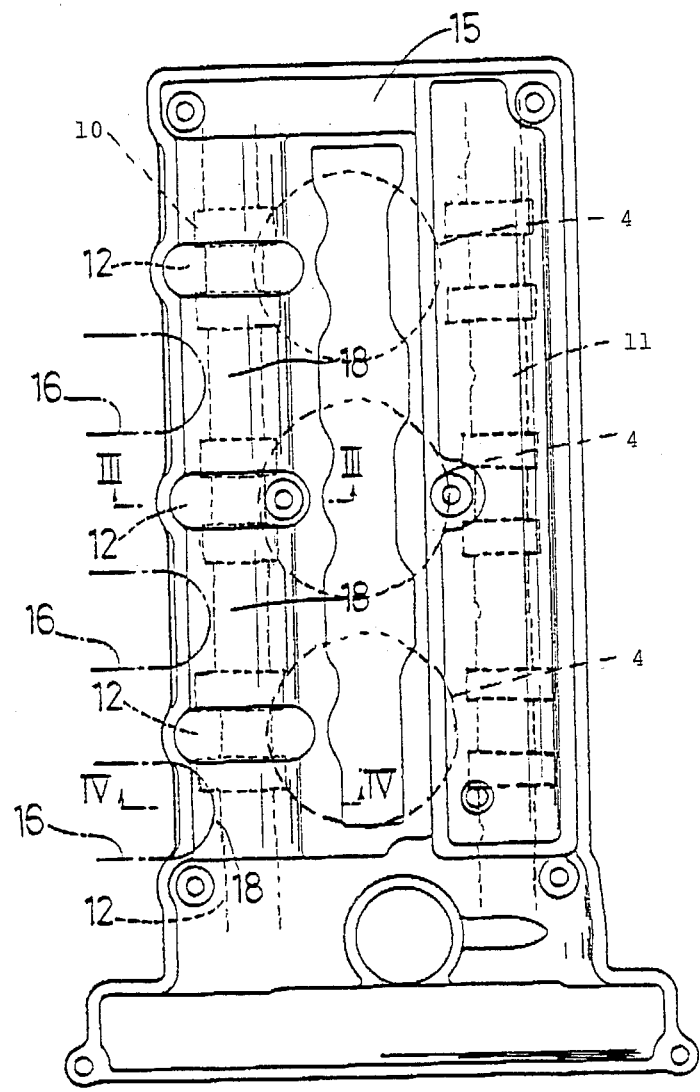
FIG. 2 is a plan view showing the right cylinder bank of the engine.
Figure 3:
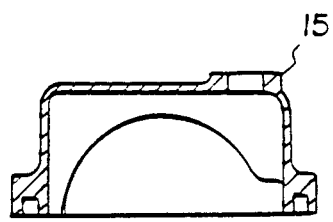
FIG. 3 is a cross-sectional view taken along line III—III in FIG. 2.
Figure 4:
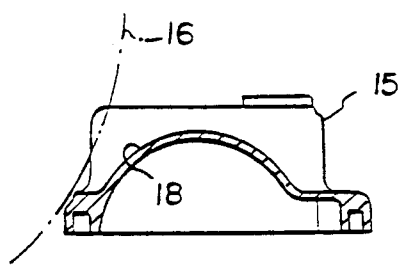
FIG. 4 is a cross-sectional view taken along line IV–IV in FIG. 2.

The cylinder heads 2 and 3 are provided with an intake port 6 and an exhaust port 7 for each cylinder 4. Each of the intake ports 6 opens to the combustion chamber 5 at one end and to the inner side wall of the corresponding cylinder bank at the other end. Each of the exhaust ports 7 opens to the combustion chamber 5 at one end and to the outer side wall of the corresponding cylinder bank at the other end. The intake port 6 is provided with an intake valve 8 at the end facing the combustion chamber 5 and the exhaust port 7 is provided with an exhaust valve 9 at the end facing the combustion chamber 5. Each of said intake valves 8 is mounted inwardly inclined with respect to the central axis of the cylinder 4. Each of the cylinder heads 2 and 3 is provided with a camshaft 10 for exclusively driving the intake valves 8 and a camshaft 11 for exclusively driving the exhaust valves 9. The camshafts 10 and 11 are disposed substantially on the extension of the longitudinal axes of the valve stems of the intake valves 8 and extend in parallel to the row of cylinders. The camshaft 10 on each cylinder head is supported by four camshaft bearings 12 and the camshift 11 on each cylinder head is supported by four camshaft bearing 13. As shown in FIG. 2, one of the four camshaft bearings 12 is disposed on the front end of the corresponding cylinder head, and the other three camshift bearings 12 are respectively disposed beside the three cylinders 4. Similarly, one of the four camshaft bearings 13 is disposed on the front end of the corresponding cylinder head, and the other three camshaft bearings 13 are respectively disposed beside the three cylinders 4. Further, the cylinder heads 2 and 3 are respectively provided with cylinder head covers 14 and 15 to cover the camshafts 10 and 11.

To each of the intake ports 6 is connected one end of a discrete intake passage 16 the other end of which is connected to a surge tank 17 disposed between the banks L and R. The downstream side portion 16a of the discrete intake passage 16 connected to each intake port 6 in each cylinder bank extends from the intake port 6 toward the other cylinder bank, and the upstream side portion 16b of the discrete intake passage 16 is disposed above the camshaft 10 for exclusively driving the intake valves 8 of said other cylinder bank and is bent upwardly to form an arc in a vertical plane toward a side of the surge tank 17.

Each of the cylinder head covers 14 and 15 is provided with recessed portions 18 at portions corresponding to the inter-bearing portions of the camshaft 10 (the portions between the camshaft bearings 12) as shown in FIGS. 1 to 4, and the upstream side portions 16b of the discrete intake passages 16 are passed through one of the recessed portions 18 not to interfere with the cylinder head cover.

By virtue of the recessed portions 18, the overall length of each discrete intake passage 16 can be sufficient to obtain an optimal inertia effect of intake air in a low engine speed range without adding to the overall height of the engine.

We claim:

1. A cylinder head cover structure for a cylinder engine having first and second cylinder heads for forming first and second cylinder banks, each cylinder head being provided, in an inner side wall thereof, with intake ports each communicating with a cylinder formed in the cylinder bank, at least one camshaft provided in each cylinder bank above intake and exhaust valves to drive the valves in synchronization with rotation of the engine and supported for rotation by a plurality of bearings, discrete intake passages each of which is connected to one of the intake ports of one of the cylinder banks and extends above the other cylinder bank, and cylinder head covers mounted on the respective cylinder heads, characterized in that recessed portions are formed in each of the cylinder head covers at corresponding portions of the camshaft and respective said discrete intake passages extend through corresponding ones of said recessed portions.

2. A cylinder head cover structure as defined in claim 1 in which said camshaft is disposed substantially on an extension of the longitudinal axis of valve stems of the intake valves.

3. A cylinder head cover structure as defined in claim 2 in which each of said intake valves is mounted inwardly inclined with respect to the central axis of the cylinder.

4. A cylinder head cover structure as defined in claim 1 in which said intake valves in each cylinder bank are driven by an intake camshaft and the exhaust valves in each cylinder bank are driven by an exhaust camshaft, and said recessed portions are formed in each of the cylinder head covers at the inter-bearing portions of the intake camshaft.

5. A cylinder head cover structure as defined in claim 4 in which a pair of intake valves are provided for each cylinder, and the bearings for supporting the intake camshaft are provided between cams for each cylinder, said recessed portions being formed at portions of the cylinder head cover corresponding to the portions of the intake camshaft between the cams for two adjacent cylinders.

6. A cylinder head cover structure as defined in claim 1 in which said first and second cylinder banks are set at 60°.

7. A cylinder head cover structure as defined in claim 1 in which each of said discrete intake passages is connected to a surge tank having a predetermined volume at an upstream end thereof, and extends from the surge tank toward one of the cylinder banks and is bent downward above the respective camshaft for the cylinder bank to extend through one of the recessed portions in the cylinder head cover toward the other cylinder bank where it is connected to one of the intake ports.

8. A cylinder head cover structure as defined in claim 7 in which each of said discrete intake passages is formed by a U-shaped portion which extends from a side of the surge tank toward one of the cylinder banks and is bent downward above the respective camshaft for the cylinder bank to extend through one of the recessed portions in the cylinder head cover toward the other cylinder bank where it is connected to one of the intake ports, and a crossing portion connected to one of the intake ports in said other cylinder bank at a downstream end thereof and to a downstream end of the U-shaped portion at an upstream end, the crossing portions of the discrete intake passages for the respective cylinder banks being located below the surge tank and crossing each other when viewed in a direction parallel to an engine output shaft.

9. A cylinder head cover structure for a cylinder engine having first and second cylinder heads for forming first and second cylinder banks, each cylinder head being provided, in an inner side wall thereof, with intake ports each communicating with a cylinder formed in the cylinder bank, a pair of intake valves for each cylinder, at least one exhaust valve for each cylinder, a pair of camshafts provided in each cylinder bank to respectively drive the intake valves and the exhaust valves in synchronization with rotation of the engine, a plurality of camshaft bearings formed in each cylinder head between the intake valves for each cylinder, discrete intake passages each of which is connected to one of the intake ports of one of the cylinder banks and extends above the other cylinder bank, and cylinder head covers mounted on the respective cylinder heads, characterized in that recessed portions are formed in each of the cylinder head covers at inter-cylinder portions of the camshaft and respective said discrete intake passages extend through corresponding ones of said recessed portions.

10. A cylinder head cover structure as defined in claim 9 in which each of said discrete intake passages is connected to a surge tank having a predetermined volume at an upstream end thereof, and extends from the surge tank toward one of the cylinder banks and is bent downward above the respective camshaft for the cylinder bank to extend through one of the recessed portions in the cylinder head cover toward the other cylinder bank where it is connected to one of the intake ports.

11. A cylinder head cover structure as defined in claim 10 in which each of said discrete intake passages is formed by a U-shaped portion which extends from a side of the surge tank toward one of the cylinder banks and is bent downward above the respective intake camshaft for the cylinder bank to extend through one of the recessed portions in the cylinder head cover toward the other cylinder bank where it is connected to one of the intake ports, and a crossing portion connected to one of the intake ports in the other cylinder bank at a downstream end thereof and to a downstream end of the U-shaped portion at an upstream end, the crossing portions of the discrete intake passages for the respective cylinder banks being located below the surge tank and crossing each other when viewed in a direction parallel to an engine output shaft.

12. A cylinder head cover structure as defined in claim 9 in which said first and second cylinder banks are set at 60°.

* * * * *